United States Patent

Prasad et al.

[11] Patent Number: 6,153,163
[45] Date of Patent: Nov. 28, 2000

[54] CERAMIC MEMBRANE REFORMER

[75] Inventors: Ravi Prasad, East Amherst; Christian Friedrich Gottzmann, Clarence; Joseph Michael Schwartz, Amherst, all of N.Y.

[73] Assignee: Praxair Technology, Inc., Danbury, Conn.

[21] Appl. No.: 09/089,368

[22] Filed: Jun. 3, 1998

[51] Int. Cl.[7] .............................. C01B 31/18; C01B 3/26
[52] U.S. Cl. ......................... 423/246; 423/651; 252/373
[58] Field of Search ................................. 423/246, 579, 423/648.1, 650, 651, 659; 252/373

[56] References Cited

U.S. PATENT DOCUMENTS

| | | | |
|---|---|---|---|
| 3,901,669 | 8/1975 | Seitzer | 55/16 |
| 4,120,663 | 10/1978 | Fally | 422/198 |
| 4,791,079 | 12/1988 | Hazbun | 502/4 |
| 4,793,904 | 12/1988 | Mazanec et al. | 204/59 |
| 5,082,751 | 1/1992 | Reichner | 429/19 |
| 5,143,800 | 9/1992 | George et al. | 429/20 |
| 5,152,976 | 10/1992 | Fong et al. | 423/652 |
| 5,160,713 | 11/1992 | Mazanec et al. | 423/210 |
| 5,229,102 | 7/1993 | Minet et al. | 423/652 |
| 5,306,411 | 4/1994 | Mazanec et al. | 204/265 |
| 5,547,494 | 8/1996 | Prasad et al. | 95/54 |
| 5,562,754 | 10/1996 | Kang et al. | 95/54 |
| 5,573,737 | 11/1996 | Balachandran et al. | 422/211 |
| 5,702,999 | 12/1997 | Mazanec et al. | 501/152 |
| 5,712,220 | 1/1998 | Carolan et al. | 502/400 |
| 5,733,435 | 3/1998 | Prasad et al. | 205/765 |

FOREIGN PATENT DOCUMENTS 1242401A  3/1988  Japan .

OTHER PUBLICATIONS

Iwahara et al., "Performance of Solid Oxide Fuel Cell using Proton and Oxide Ion Mixed Conductors Based on $BaCe_{1-x}Sm_xO_{3-a}$", The Electrochemical Society, Inc., pp. 1687–1691, vol.140 (1993).

Basile et al., "Membrane Reactor for Water Gas Shift Reaction", Gas Separation, pp. 243–254, vol. 10 (1996).

Nozaki et al., "Oxide Ion Transport for Selective Oxidative Coupling of Methane with New Membrane Reactor", AIChE Journal, pp. 870–877, vo. 40 (1994).

Balachandran et al., "Dense Ceramic Membranes for Partial Oxidation of Methane to Syngas", Applied Catalysts, pp. 19–29 (1995).

*Primary Examiner*—Steven P. Griffin
*Assistant Examiner*—Elin A Warn
*Attorney, Agent, or Firm*—David M. Rosenblum

[57] ABSTRACT

A process to generate an enhanced output of a desired product from an ion transport reactor utilizes the reaction products from both the cathode side and the anode side of an oxygen selective ion transport ceramic membrane. An oxygen donating first feed stream containing the desired product in a chemically bound state is delivered to the cathode side while an oxygen accepting second feed stream is delivered to the anode side. Following chemical reactions on both the cathode side and the anode side, a desired product is recovered from a first product stream exiting from the cathode side and from a second product stream exiting from the anode side such that the sum of the desired product contained within the two product streams exceeds that attainable from either product stream alone.

15 Claims, 6 Drawing Sheets

CERAMIC MEMBRANE REFORMER

FIELD OF THE INVENTION

This invention relates to a process for enhancing the recovery of desired products from an ion transport reactor. More particularly, the desired products are recovered from both the anode side and the cathode side of the reactor thereby increasing the yield of desired products.

BACKGROUND OF THE INVENTION

Oil and petrochemical companies have discovered vast quantities of natural gas in remote locations such as in polar regions and under seas. Transport of natural gas, which consists mostly of methane, is difficult and methane cannot presently be economically converted into more valuable products, such as hydrogen, or into products that are more economically contained or transported, such as liquid fuels including methanol, formaldehyde and olefins.

Typically, the methane is converted to synthesis gas (syngas), an intermediate in the conversion of methane to liquid fuels. Syngas is a mixture of hydrogen and carbon monoxide with a $H_2/CO$ molar ratio of from about 0.6 to about 6.

The conversion of methane to syngas is presently accomplished by either a methane steam reforming process or a carbon dioxide reforming process. Methane steam reforming is an endothermic reaction:

$$CH_4 + H_2O \rightarrow CO + 3H_2. \qquad (1)$$

This process has a relatively high yield of hydrogen gas ($H_2$), producing three moles of hydrogen gas for each mole of carbon monoxide produced. The reaction kinetics require the addition of significant amounts of heat rendering the process economically less desirable.

Carbon dioxide reforming is also an endothermic process:

$$CH_4 + CO_2 \rightarrow 2CO + 2H_2. \qquad (2)$$

The carbon dioxide reforming reaction is somewhat less efficient than the steam methane reforming reaction, generating one mole of hydrogen gas for every mole of carbon monoxide formed. The endothermic reaction requires the input of a significant amount of heat, rendering the process also economically less desirable.

Another approach is the direct partial oxidation of methane which can utilize an ionic conducting membrane reactor or a mixed conducting membrane reactor in accordance with the equation:

$$CH_4 + \tfrac{1}{2}O_2 \rightarrow CO + 2H_2. \qquad (3)$$

In an ionic or mixed conducting membrane reactor, a solid electrolyte membrane that has oxygen selectivity is disposed between an oxygen containing feed stream and an oxygen consuming, typically methane-containing, product stream. "Oxygen selectivity" means that oxygen ions are transported across the membrane while other elements, and ions thereof, are not. The solid electrolyte membrane is made from inorganic oxides, typified by calcium- or yttrium-stabilized zirconium and analogous oxides, often having a fluorite or a perovskite structure.

At elevated temperatures, typically in excess of 500° C., and preferably in the range of 700° C.–1200° C., the solid electrolyte membranes contain mobile oxygen ion vacancies that provide conduction sites for the selective transport of oxygen ions through the material. Because the membranes allow only oxygen transport, they function as a membrane with an infinite selectivity for oxygen and are therefore very attractive for use in air separation processes.

In an ionic type system, the membrane transports only oxygen ions and the two electrons released by the oxygen in the course of equation (3) are transported across the membrane by an external electric field.

U.S. Pat. No. 4,793,904 to Mazanec et al., that is incorporated by reference in its entirety herein, discloses an ionic transport membrane coated on both sides with an electrically conductive layer. An oxygen-containing gas contacts one side of the membrane. Oxygen ions are transported through the membrane to the other side where the ions react with methane or similar hydrocarbons to form syngas. The electrons released by the oxygen ions flow from the conductive layer to external wires and may be utilized to generate electricity.

In a mixed conductor-type membrane, the membrane is a dual phase ceramic having the ability to selectively transport both oxygen ions and electrons. With this type membrane, it is not necessary to provide an external electric field for removal of the electrons released by the oxygen ions. U.S. Pat. No. 5,306,411 by Mazanec et al., that is incorporated by reference in its entirety herein, discloses application of a mixed conductor-type membrane. The membrane has two solid phases in a perovskite crystalline structure: a phase for oxygen ion transport and a second phase for electron conduction. The oxygen ion transport is disclosed as being useful to form syngas and to remediate flue gases such as $NO_x$ and $SO_x$.

U.S. Pat. No. 5,573,737 to Balachandran et al. also discloses the use of an ionic or mixed conducting membrane to separate oxygen and subsequently react the oxygen ions with methane to form syngas.

The partial oxidation reaction is exothermic and once initiated does not require the additional input of heat. However, the yield of two moles of hydrogen gas per mole of carbon monoxide produced is 33% lower than the yield achieved by conventional steam methane reforming (see equation 1).

Integration of an ion transport membrane with other apparatus or processes to enhance either yield or efficiency is disclosed in commonly assigned U.S. patent application Ser. No. 08/848,200, now abandoned, entitled "Method of Producing Hydrogen Using Solid Electrolyte Membrane" by Gottzmann et al., filed on Apr. 29, 1997, and is incorporated by reference in its entirety herein. An oxygen selective ion transport membrane and a proton (hydrogen ion) selective membrane are combined to enhance hydrogen gas production. The oxygen ions transported through the oxygen selective membrane are reacted with hydrocarbons to form syngas. The syngas contacts a proton selective membrane that selectively transports hydrogen ions to be reformed as hydrogen gas.

Commonly owned U.S. patent application Ser. No. 08/848,258 now U.S. Pat. No. 5,865,878 entitled "Method for Producing Oxidized Product and Generating Power Using a Solid Electrolyte Membrane Integrated with a Gas Turbine" by Drnevich et al., filed on Apr. 29, 1997, and is incorporated by reference in its entirety herein, discloses the integration of an ion transport membrane with a gas turbine. An oxygen-containing gas stream contacts an oxygen selective ion transport membrane. Oxygen ions transported through the membrane are used to generate oxidized products. The oxygen depleted feedstock stream, that is heated during the exothermic reaction, is delivered to a gas turbine combustor at an elevated temperature.

Direct partial oxidation is also possible using oxygen that has been separated outside of the reactor, such as by distillation or pressure swing adsorption (PSA). A conventional catalytic chemical reactor can be used for the reaction and, in which instance, no membrane is necessary. Direct partial oxidation can also be done using air, rather than oxygen, however, the process becomes less economical.

While integration enhances the economic desirability of the direct partial oxidation reaction, there remains a need to enhance the yield achieved by the process to levels approximately equivalent to the steam methane reforming process.

OBJECTS OF THE INVENTION

It is therefore an object of the invention to provide a process for generating an enhanced output of a desired product from an ion transport reactor. It is a further object of this invention to provide such a process that will enhance the output of hydrogen gas from the direct partial oxidation of methane.

Yet another object of the invention is to simultaneously utilize the chemical reactions occurring on both sides of an ion transport membrane to obtain the enhanced output of the desired product. It is a further object of this invention to provide such a desired product, together with useful byproducts. Such byproducts may include, without limitation, carbon dioxide, carbon monoxide, nitrogen, argon, electric power, and combinations thereof.

SUMMARY OF THE INVENTION

This invention comprises a process for generating an enhanced output of a desired product from an ion transport reactor. In accordance with the process, there is provided an ion transport reactor that has an oxygen selective ion transport membrane disposed within the reactor. The oxygen selective ion transport membrane has a cathode side and an anode side. An oxygen donating first feed stream that contains the desired product in a chemically bound state is delivered to the cathode side at a first oxygen partial pressure. At the same time, an oxygen accepting second feed stream that contains a desired product, such as hydrogen, in a chemically bound state is delivered to the anode side and establishes a second oxygen partial pressure on the anode side. The first oxygen pressure is selected to be greater than the second oxygen partial pressure. The oxygen selective ion transport membrane is operated at an elevated temperature that is sufficient to facilitate oxygen ion transport through the membrane. Elemental oxygen obtained from the first feedstock is transported through the membrane to react with the second feed stream. A first product stream is then recovered from the cathode side of the ion transport reactor. This first product stream contains a first portion of the desired product. A second product stream is then recovered from the anode side and contains a second portion of the desired product. The sum of the first portion plus the second portion provides a total of the desired product. The percent conversion to the desired product from the combination of the first portion and the second portion preferably exceeds that obtainable from the second feed stream alone, thereby providing the enhanced output of the desired product.

In a preferred embodiment, the oxygen donating first feed stream contains at least one component selected from the group consisting of NOx, water vapor, carbon dioxide, and combinations thereof and the oxygen accepting second feed stream contains at least one component selected from the group consisting of hydrogen containing reactants, carbon containing reactants, and combinations thereof.

In another preferred embodiment, the reactor is operated at a temperature of in excess of 500° C. In yet another preferred embodiment, hydrogen gas is separated from both the first portion and the second portion as the desired product.

BRIEF DESCRIPTION OF THE DRAWINGS

Other objects, feature s and advantages will occur to those skilled in the art from the following description of preferred embodiments and the accompanying drawings, in which.

DETAILED DESCRIPTION OF THE INVENTION

This invention may be accomplished by providing an ion transport reactor that contains an oxygen-selective ion transport ceramic membrane having a cathode side and an anode side, and operating the reactor as a ceramic membrane reformer. By delivering an oxygen-donating feed stream containing a desired product in a chemically bound state to the cathode side while simultaneously delivering an oxygen-accepting feed stream that contains hydrogen in a chemically bound state to the anode side, desired products may be isolated from the output streams of both the anode side and the cathode side. The total of desired product obtained from these two separate output streams from such a ceramic membrane reformer exceeds the output total attainable from either stream alone.

Figure 1:
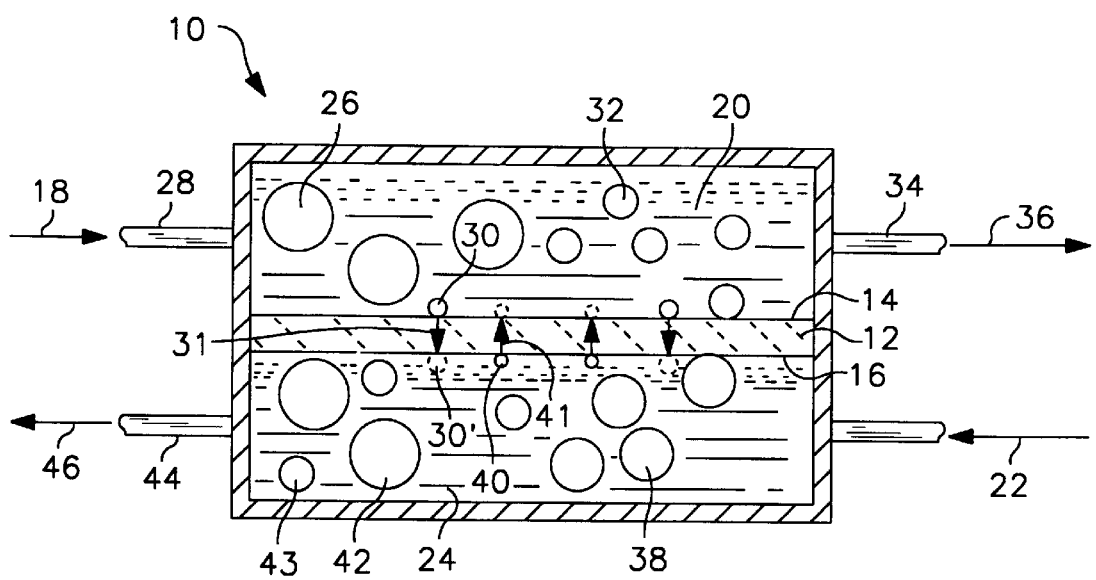
FIG. 1 illustrate s in cross-sectional representation a mixed conductor ion transport membrane operated as a reformer reactor in accordance with the invention.

FIG. 1 illustrates in cross-sectional representation an ion transport reactor 10 for operation as a ceramic membrane reformer in a process of the invention. While the ion transport reactor 10 is of the mixed conductor type, an ionic conducting membrane reactor could be utilized without significantly affecting the process of the invention. Membranes operating on a partial pressure gradient are preferred because no external force is required to drive the oxygen separation. However, an external current could be used to drive ion transport through the dense membranes without affecting the spirit of the invention. While the addition of an external current requires extra equipment and cost, process economics may not be substantially changed.

Disposed within the ion transport reactor 10 is an oxygen-selective ion transport membrane 12. The oxygen-selective ion transport membrane 12 has a cathode side 14 and an anode side 16.

The oxygen-selective ion transport membrane 12 is formed as either a dense wall solid oxide mixed or dual phase conductor, or alternatively, as a thin film solid oxide mixed or dual phase conductor that is supported on a porous substrate. The ion transport material has the ability to transport oxygen ions and electrons at the prevailing oxygen partial pressure in the temperature range of from about 500° C. to about 1200° C. when a chemical potential difference is maintained across the ion transport membrane surface caused by a ratio in oxygen partial pressures across the ion transport membrane. Suitable materials for the ion transport membrane include perovskites and dual phase metal-metal oxide combinations as listed in Table 1. Since the reactive environment on the anode side 16 of the oxygen selective ion transport membrane 12, in many applications, creates very low partial oxygen pressures, the chromium-containing perovskites of Table 1 may be the preferred material since these tend to be stable in the low partial oxygen pressure environment. The chromium-containing perovskites are not chemically decomposed at very low partial oxygen pressures.

Optionally, a porous catalyst layer, possibly made from the same perovskite material, may be added to one or both sides of the oxygen transport membrane to enhance oxygen surface exchange and the chemical reactions on the surfaces. Alternatively, the surface layers of the oxygen selective ion transport membrane may be doped, for example, with cobalt, to enhance surface exchange kinetics.

TABLE 1

Oxygen Ion Conductor Materials

1. $(La_{1-x}Sr_x)(Co_{1-y}Fe_y)O_{3-\delta}$ ($0 \leq x \leq 1$, $0 \leq y \leq 1$, $\delta$ from stoichimetry)
2. $SrMnO_{3-\delta}$
   $SrMn_{1-x}Co_xO_{3-\delta}$ ($0 \leq x \leq 1$, $0 \leq y \leq 1$, $\delta$ from stoichimetry)
   $Sr_{1-x}Na_xMnO_{3-\delta}$
3. $BaFe_{0.5}Co_{0.5}YO_3$
   $SrCeO_3$
   $YBa_2Cu_3O_{7-\beta}$ ($0 \leq \beta \leq 1$, $\beta$ from stoichimetry)
4. $La_{0.2}Ba_{0.8}Co_{0.8}Fe_{0.2}O_{2.6}$;
   $Pr_{0.2}Ba_{0.8}Co_{0.8}Fe_{0.2}O_{2.6}$
5. $A_xA'_xA''_xB_yB'_yB''_yO_{3-z}$ (x, x', x'', y, y', y'' all in 0–1 range)
   where: A, A', A'' = from groups 1, 2, 3 and f-block lanthanides
   B, B', B'' = from d-block transition metals

| | | | |
|---|---|---|---|
| 6. | (a) Co-La-Bi type: | Cobalt oxide | 15–75 mole % |
| | | Lanthanum oxide | 13–45 mole % |
| | | Bismuth oxide | 17–50 mole % |
| | (b) Co-Sr-Ce type: | Cobalt oxide | 15–40 mole % |
| | | Strontium oxide | 40–55 mole % |
| | | Cerium oxide | 15–40 mole % |

TABLE 1-continued

Oxygen Ion Conductor Materials

| | | | |
|---|---|---|---|
| | (c) Co-Sr-Bi type: | Cobalt oxide | 10–40 mole % |
| | | Strontium oxide | 5–50 mole % |
| | | Bismuth oxide | 35–70 mole % |
| | (d) Co-La-Ce type: | Cobalt oxide | 10–40 mole % |
| | | Lanthanum oxide | 10–40 mole % |
| | | Cerium oxide | 30–70 mole % |
| | (e) Co-La-Sr-Bi type: | Cobalt oxide | 15–70 mole % |
| | | Lanthanum oxide | 1–40 mole % |
| | | Strontium oxide | 1–40 mole % |
| | | Bismuth oxide | 25–50 mole % |
| | (f) Co-La-Sr-Ce type: | Cobalt oxide | 10–40 mole % |
| | | Lanthanum oxide | 1–35 mole % |
| | | Strontium oxide | 1–35 mole % |
| | | Cerium oxide | 0–70 mole % |

7. $Bi_{2-x-y}M'_xM_yO_{3-\delta}$ ($0 \leq x \leq 1$, $0 \leq v \leq 1$, $\delta$ from stoichimetry)
   where: M'= Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where,
   x equals from zero to about 1.
9. One of the materials of $AA'_rB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B'' represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B'' in the formula; and $0.9 < (s + t)/(u + v + w) < 1.1$
10. One of the materials of $La_{1-x}Sr_xCu_{1-y}M_yO_{3-\delta}$ family, where:
    M represents Fe or Co;
    x equals from zero to about 1;
    y equals from zero to about 1;
    $\delta$ equals a number that satisfies the valences of La, Sr, Cu, and M in the formula.
11. One of the materials of $Ce_{1-x}A_xO_{2-\delta}$ family, where:
    A represents a lanthanide, Ru, or Y; or a mixture thereof;
    x equals from zero to about 1;
    $\delta$ equals a number that satisfies the valences of Ce and A in the formula.
12. One of the materials of $Sr_{1-x}B_xFeO_{3-\delta}$ family, where:
    x equals from zero to about 1;
    $\delta$ equals a number that satisfies the valences of Sr, Bi and Fe in the formula.
13. One of the materials of $Sr_xFe_yCo_zO_w$ family, where:
    x equals from zero to about 1;
    y equals from zero to about 1;
    z equals from zero to about 1;
    w equals a number that satisfies the valences of Sr, Fe and Co in the formula.
14. Dual phase mixed conductors (electronic/ionic):

$(Pd)_{0.5}/(YSZ)_{0.5}$
$(Pt)_{0.5}/(YSZ)_{0.5}$
$(B-MgLaCrO_x)_{0.5}(YSZ)_{0.5}$
$(In_{90\%}Pt_{10\%})_{0.6}/(YSZ)_{0.5}$
$(In_{90\%}Pt_{10\%})_{0.5}/(YSZ)_{0.5}$
$(In_{95\%}Pr_{2.5\%}Zr_{2.5\%})_{0.5}/(YSZ_{0.5}$
Any of the materials described in 1–13, to which a high temperature metallic phase (e.g., Pd, Pt, Ag, Au, Ti, Ta, W) is added.

The ion transport reactor 10 is operated at an elevated temperature that is sufficient to facilitate oxygen ion transport through the oxygen-selective ion transport membrane. The operating temperature is at least 500° C., and preferably in the range of from about 700° C. to about 1200° C. and most preferably, in the range of from about 800° C. to about 1000° C.

During operation, oxygen donating first feed stream 18 is delivered to a first reaction vessel or chamber 20 in contact with the cathode side 14 of the oxygen-selective ion transport membrane 12. The oxygen-donating first feed stream 18 may be any gaseous composition that contains the desired product in a chemically bound state. This includes compositions that are gaseous at the operating temperature of the ion transport reactor, even if in a different state at room temperature, for example steam. Exemplary compositions for the first feed stream 18 include NOx (where x is from 0.5 to 2), water vapor, carbon dioxide, and combinations thereof.

Simultaneous with the delivery of the oxygen-donating first feed stream 18 to the first reaction vessel 20 on the cathode side 14 of the oxygen-selective ion transport membrane 12 is the delivery of an oxygen-accepting second feed stream 22 to a second reaction vessel or chamber 24 that contacts the anode side 16 of the oxygen selective ion transport membrane 12. The oxygen-accepting second feed stream 22 is any suitable gaseous stream that contains hydrogen in a chemically bound state. Exemplary components for the oxygen-accepting second feed stock include hydrogen-containing reactants, carbon-containing reactants and combinations thereof. More preferred are light hydrocarbons of the form CxHy where x is between 1 and 5 and y is between 4 and 12. Most preferred is methane.

Both the oxygen-donating first feed stream 18 and the oxygen-accepting second feed stream 22 may further include non-reactive diluents and sweep gases such as nitrogen, argon, steam or carbon dioxide. While a small fraction of a steam or carbon dioxide gas input will react, a larger fraction of the gas input will not and therefore steam and carbon dioxide function as sweep gases instead of reactive gases.

Oxygen containing molecules 26 contained within the oxygen donating feed stream 18 enter the ion transport reactor 10 through cathode side inlet 28. Elemental oxygen 30 is dissociated from the oxygen containing molecules 26 at the cathode side 14 of the oxygen selective ion transport membrane 12. Elemental oxygen, in the form of oxygen ions ($O^{--}$), is transported as shown by arrow 31 through the oxygen selective ion transport membrane 12 to the anode side 16. Oxygen depleted molecules 32 exit the ion transport reactor 10 through cathode side outlet 34 as a first product stream 36, also referred to as the retentate, that is, the constituents retained on the cathode side 14 of the oxygen selective ion transport membrane 12.

"Elemental oxygen" refers to oxygen that is uncombined with other elements of the Periodic Table. While typically in diatomic form, the term "elemental oxygen" as used herein is intended to encompass single oxygen atoms, triatomic ozone, and other forms uncombined with other elements.

The elemental oxygen 30 in the form of oxygen ions ($O^{--}$) is transported, by means of lattice vacancies, through the oxygen selective ion transport membrane 12 to the anode side 16. Once in the second reaction vessel 24, the elemental oxygen 30' reacts with oxygen-consuming molecules 38 contained within the oxygen-accepting second feed stream 22. During the oxidation reactions, the oxygen ions surrender electrons 40 that are then transported as shown by arrow 41 through the oxygen selective ion transport membrane 12 and become available on the cathode side 14 to combine with the elemental oxygen 30 to form oxygen ions. The reaction products 42, 43 typically include both oxygen containing molecules 42, such as CO and $CO_2$, and hydrogen gas 43. The reaction products 42, 43 exit the ion transport reactor 10 through an anode side outlet 44 as second product stream 46. The second product stream 46 is also referred to as the permeate, referring to constituents that include the oxygen that was transported through the oxygen-selective ion transport membrane 12.

While FIG. 1 illustrates the oxygen-donating first feed stream 18 and oxygen-accepting second feed stream 22 flowing in counter current relationship, cocurrent flow may be applicable under certain applications.

The flux rate, that is, the rate of oxygen ion transport through the oxygen selective ion transport membrane 12, is driven by the differential in oxygen partial pressure (Opp) between the constituents of the first reaction vessel 20 (first $O_{pp}$) and the constituents of the second reaction vessel 24 (second $O_{pp}$). It is desirable to maximize the flux rate. Preferably, the differential between the first $O_{pp}$ and the second $O_{pp}$ is at least a factor of 1000 and more preferably, on the order of between $10^{10}$ and $10^{15}$. For example, the first $O_{pp}$ may be on the order of 0.1 atmosphere and the second $O_{pp}$ on the order of $10^{-14}$ atmosphere.

To reduce the second $O_{pp}$, an easily separated diluent, or sweep gas, such as steam may be included in the oxygen-accepting second feed stream 22.

Alternatively, the flux rate may be electrically driven. When the flux through the membrane is electrically driven, an oxygen partial pressure gradient is not required and therefore, for this alternative, the first $O_{pp}$ is not always greater than the second $O_{pp}$.

A process of the invention provides an effective method to increase the hydrogen yield and to control the composition of the gas in the first product stream 36 and in the second product stream 46. The hydrogen yield per methane molecule may be increased by up to 50% by feeding steam to the cathode side 14 of the oxygen selective ion transport membrane 12. Similarly, the carbon monoxide yield may be doubled by feeding $CO_2$ to the cathode side.

When steam is fed to the cathode side, the cathode side reaction is:

$$H_2O \Rightarrow H_2 + \tfrac{1}{2}O_2 \qquad (4)$$

and the anode side reaction:

$$CH_4 + \tfrac{1}{2}O_2 \Rightarrow CO + 2H_2. \qquad (3)$$

Combining equations (3) and (4):

$$CH_4 + H_2O \Rightarrow CO + 3H_2. \qquad (1)$$

When carbon dioxide is fed to the cathode side, the cathode side reaction is:

$$CO_2 \Rightarrow CO + \tfrac{1}{2}O_2 \qquad (5)$$

and the anode side reaction:

$$CH_4 + \tfrac{1}{2}O_2 \Rightarrow CO + 2H_2. \qquad (3)$$

Combining equations (5) and (3):

$$CH_4 + CO_2 \Rightarrow 2CO + 2H_2. \qquad (2)$$

The decomposition of $CO_2$ on the cathode side and the partial oxidation reaction on the anode side both produce CO. Because the CO comes from both CO2 and $CH_4$, the molar yield of CO in the output exceeds the molar input of methane.

The anode side reactions are exothermic and require the removal of heat for steady state operation. Most of the heat is removed by the product gas, some removed by heat exchange, and some lost. The cathode side reactions are endothermic and provide a sink for heat removal from the anode side, thereby providing heat control for the ceramic membrane reformer. Steam could be injected into the reactor at specific hot spots to increase heat removal. Further, the steam optionally may be preheated before it is introduced into the reactor to achieve a desired temperature level. Such steam additions could provide increased hydrogen yield. Hot spots occur on the anode side of the membrane where there is a leak or the local oxygen flux is high leading to zones of complete, rather than partial, combustion. The opportunity to provide targeted heat removal to specific zones of the reactor should greatly improve reactor control and operation, as well as increase membrane operating life by providing a more uniform temperature and reduced thermal stress, a cause of membrane failure. Control means include temperature sensors and a microprocessor in a feedback control loop may be utilized to apply heat transfer techniques to adjust local temperature levels as desired, similar to the feedback control shown in U.S. Pat. No. 5,547,494. Heat transfer techniques described herein adjust heat within the reactor, as opposed to only through the walls of the reactor, thereby providing a faster response to thermal upsets.

Reactive purge arrangements are disclosed in "Reactive Purge for Solid Electrolyte Membrane Gas Separation", U.S. Ser. No. 08/567,699, filed Dec. 5, 1995, E.P. Publ. No. 778,069, now U.S. Pat. No. 5,837,125 and incorporated herein by reference. Preferred configurations for ion transport modules utilizing a reactive purge are disclosed in "Solid Electrolyte Ionic Conductor Reactor Design", U.S. Ser. No. 08/848,204, filed Apr. 29, 1997 now U.S. Pat. No. 5,820,655 and also incorporated herein by reference. Both applications are commonly owned with the present application.

Figure 11:
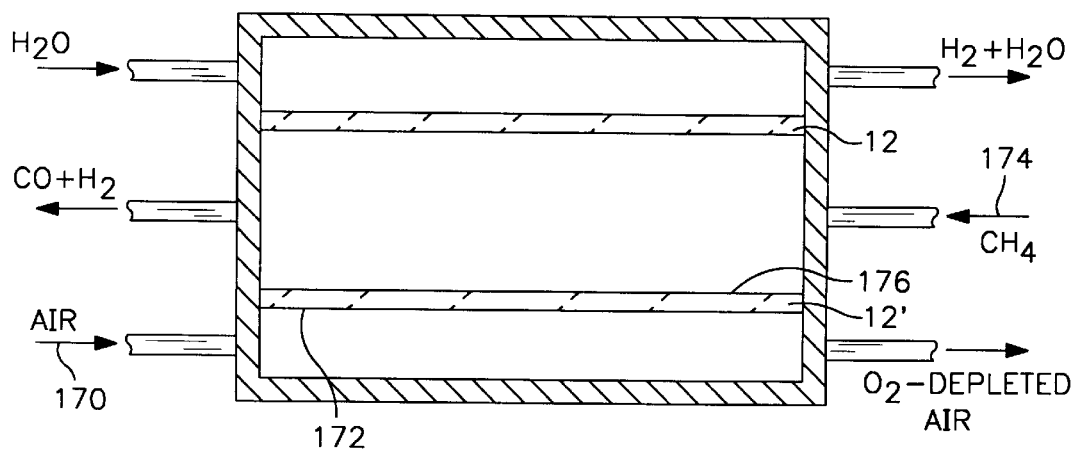
FIG. 11 illustrates in cross-sectional representation a thermoneutral mixed ion transport reactor operated in accordance with the present invention.

The overall process is endothermic if all oxygen that permeates the membrane is obtained from $H_2O$ or $CO_2$. A method to achieve a thermoneutral reactor is illustrated in FIG. 11. $O_2$, preferably in the form of air 170, is added to the cathode side 172 of a second oxygen selective ion transport membrane 12'. Oxygen ions permeate the second oxygen selective ion transport membrane 12' and react exothermally with methane 174 on the anode side 176. This reaction puts heat into the system because the partial oxidation reaction produces heat without endothermic decomposition of $H_2O$ or $CO_2$.

By processes described in more detail hereinbelow, a first portion of a desired product is recovered from the first product stream 36 and a second portion of the desired product is recovered from the second product stream 46. An exemplary desired product is hydrogen gas. The sum of the first portion, recovered from the first product stream, and the second portion, recovered from the second product stream, provides a total of a desired product. The amount of desired product received from the combination of the first portion and the second portion exceeds that obtainable from either feed stream alone, and particularly the second feed stream alone, thereby providing the enhanced output of the desired product.

Figure 2:
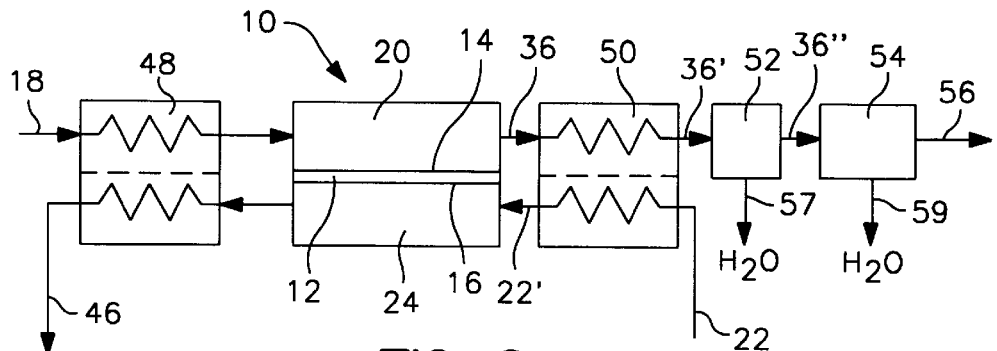
FIG. 2 is a process flow diagram illustrating the generation of hydrogen gas from the cathode side of the mixed conductor ion reactor of FIG. 1.

The process of the invention will be better understood with reference to FIGS. 2 through 7. Referring to FIG. 2, an oxygen-donating first feed stream 18 is supplied to a first reaction vessel 20 on the cathode side 14 of an ion transport reactor 10. Prior to entering the first reaction vessel 20, the oxygen-donating first feed stream is preferably heated to a temperature in the range of from about 600° C. to about 1200° C., more preferably to about 900° C. Any suitable means may be employed to heat the oxygen donating first feed stream 18, but preferably, to efficiently utilize the heat generated by the exothermic reactions occurring in the second reaction vessel 24, a heat exchanger 48 thermally couples the incoming oxygen donating first feed stream 18 and the second product stream 46.

In a first embodiment, the oxygen-donating first feed stream 18 includes steam that partially dissociates into hydrogen and oxygen ions on contact with the oxygen selective ion transport membrane 12. Elemental oxygen ions are transported through the oxygen selective ion transport membrane 12 to the anode side 16. The first product stream 36, containing hydrogen gas and non-dissociated water, is cooled by any suitable cooling means, preferably a heat exchanger 50 that is thermally coupled with the incoming oxygen accepting second feed stream 22. A reduced temperature first product stream 36' is then delivered to any apparatus effective to separate most of the water 57 from the hydrogen gas. A coalescer 52 may be utilized. A substantially pure hydrogen gas first product stream 36" is further dried by any suitable means such as adsorption drying 54 resulting in an isolated first portion 56 of the desired product, in this embodiment, hydrogen, and a waste stream 59.

The isolated first portion of the hydrogen 56 may be produced at high pressures by supplying steam as the oxygen donating first feed stream 18 at relatively high pressures, on the order of from 10 to 50 bar.

In an alternative embodiment, the oxygen donating first feed stream 18 may be carbon dioxide in which case the isolated first portion is carbon monoxide. In another alternative embodiment, the oxygen donating first feed stream 18 may be a pollutant such as NOx, where x is typically from 0.5 to 2. In this embodiment, the isolated first portion 56 is nitrogen gas that does not have the economic value of hydrogen gas or carbon monoxide. However, this alternative embodiment has value because it could replace pollution control processes that would be necessary to remove NOx and adds further value by supplying elemental oxygen to the second reaction vessel 24.

Each of the alternative embodiments described above utilizes, as an oxygen donating first feed stream, an oxygen containing molecule that dissociates at the cathode side 14 of the oxygen selective ion transport membrane 12 and transports oxygen ions to the anode side 16 for reaction within the second reaction vessel 24. Also provided to the second reaction vessel 24 is an oxygen accepting second feed stream 22 that, depending on the desired product, is either a hydrogen-containing reactant, a carbon-containing reactant, or a combination thereof. Preferably, the oxygen accepting second feed stream 22 is a light hydrocarbon of the form CxHy where x is between 1 and 5. Most preferably, the oxygen accepting second feed stream 22 is natural gas, either well head or commercially produced, that contains a substantial quantity of methane or methane gas.

Water and carbon dioxide may also be added to the oxygen accepting second feed stream, particularly if it is desired to form syngas. The oxygen accepting second feed stream 22 is preferably heated prior to delivery to the second reaction vessel 24. Thermal coupling, by means of heat exchanger 50 with the first product stream 36, is one exemplary means to heat the oxygen accepting second feed stream. The pre-heated oxygen accepting second feed stream 22' is then supplied to the second reaction vessel 24 where an exothermic partial oxidation reaction:

$$CH_4 + \tfrac{1}{2}O_2 \rightarrow CO + 2H_2. \qquad (3)$$

forms syngas. The second product stream 46 exits the second reaction vessel and is preferably cooled by any suitable means, such as by thermal coupling through heat exchanger 48 to the incoming oxygen donating first feed stream.

While it is preferable to optimize the hydrogen gas output, integration of the ion transport membrane 12 with assorted processes yields either enhanced desired product output or a more economical process.

Figure 3:
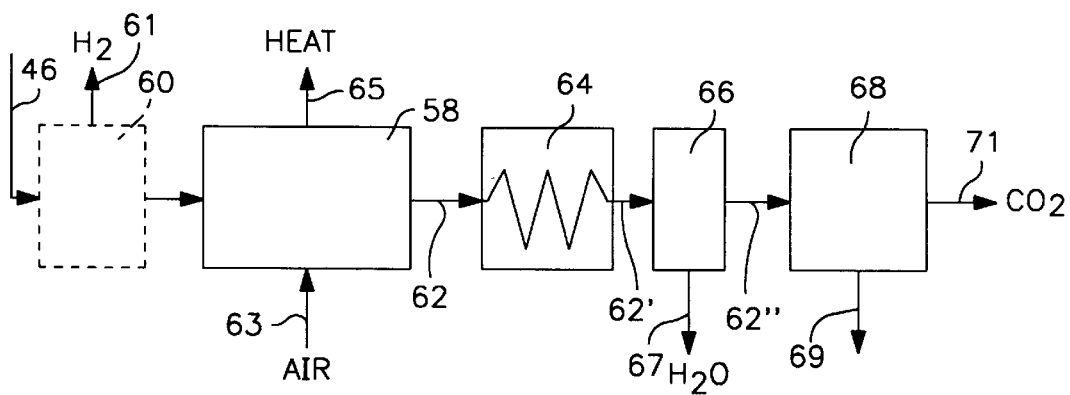
FIG. 3 is a process flow diagram illustrating a first method to isolate hydrogen gas and carbon dioxide from the anode side of the mixed ion transport reactor of FIG. 1.

As shown in FIG. 3, the second product stream 46 may be provided to a combustor 58 where the second product stream is ignited in the presence of air 63 to generate heat 65. This heat may be used to heat other parts of the process or other processes, to generate steam, or to produce electrical power. Because no chemical products are needed on the anode side for this embodiment, low quality fuels can be used as the oxygen accepting second feed stream.

If it is desired to maximize the hydrogen output, then a hydrogen separator 60, shown in phantom, may receive the second product stream prior to delivery to the combustor 58 to generate hydrogen stream 61. Suitable hydrogen separators 60 include PSA devices and proton selective ion transport membranes that are described in more detail hereinbelow.

The exhaust 62 from the combustor 58 may be cooled by any suitable means such as heat exchanger 64. Free-water 67 is removed from the cooled exhaust gas 62', which is then dried such as by coalescer 66. Free-water depleted exhaust gas 62" is further purified to recover carbon dioxide 71. The further purification may be by amine process equipment 68 which also generates waste stream 69.

Figure 4:
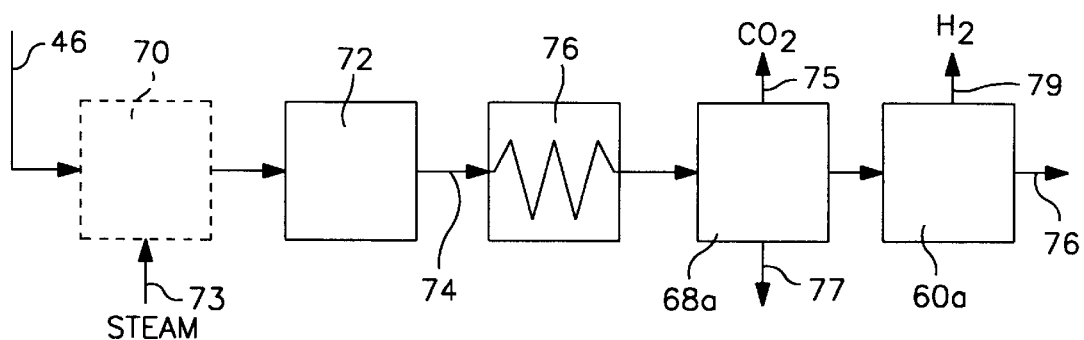
FIG. 4 is a process flow diagram illustrating another process to isolate hydrogen gas and carbon dioxide from the anode side of the mixed ion reactor of FIG. 1.

An alternative embodiment that maximizes the production of hydrogen gas is illustrated in FIG. 4. The second product stream 46 is supplied to a first water-gas shift reactor 70. With the addition of steam 73, the following reaction occurs:

$$CO + H_2O \rightarrow CO_2 + H_2.$$

The water-gas shift reaction is exothermic and excess heat from the reaction may be removed to other portions of the process. Optionally, a second water-gas shift reactor 72, shown in phantom, may sequentially follow the first water-gas shift reactor 70 and the water-gas shift reaction conducted in two stages because the reaction has a higher rate at higher temperatures and higher equilibrium conversion at lower temperatures.

The water-gas shift reaction product 74 is then cooled, such as by heat exchanger 76 and separated into carbon dioxide 75 and hydrogen gas 79. Carbon dioxide purification may be by any suitable means such as using amine process equipment 68a which generates waste stream 77. Any suitable hydrogen separator 60a such as PSA or a proton conducting membrane may be utilized to recover hydrogen gas 79. Hydrogen separator output 76 contains hydrogen gas and carbon monoxide and has significant heating value. The hydrogen separator output 76 could be sent to a combustor to recover heat or to generate steam for the process or recycled for another process, such as to the oxygen-accepting second feed stream 22. The hydrogen separator output 76 could be removed to the second product stream 46 if the hydrogen and CO content of the output were sufficiently high.

With reference back to FIG. 2, when steam is used as the oxygen donating first feed stream 18, and methane as the oxygen accepting second feed stream 22, the hydrogen to carbon monoxide ratio in the combined first product stream 36 and second product stream 46 approaches the 3/1 ratio available in conventional steam methane reforming. If carbon dioxide is used as the oxygen source, the hydrogen/carbon monoxide ratio approaches the 1/1 ratio available in conventional carbon dioxide methane reforming. This enables excellent control of the stoichiometric ratio in the product gas between the two limits by controlling the inlet ratio of steam to carbon dioxide and the inlet air flow to the cathode side 14 of the ion transport reactor 10. These ratios can also be changed by substituting another hydrocarbon for methane, however, the economic advantages would generally be expected to decrease because methane is considered the least expensive hydrocarbon.

Figure 5:
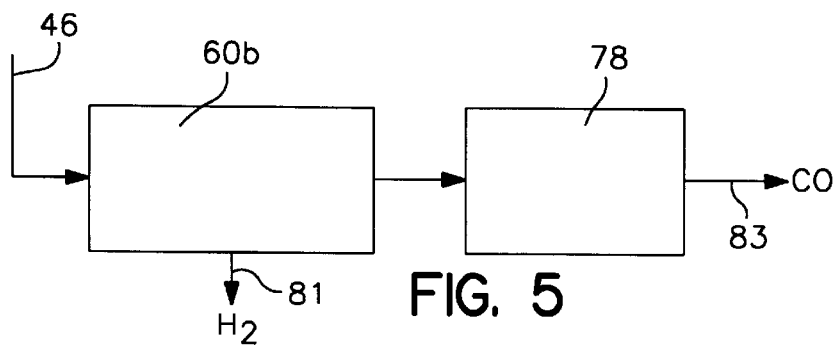
FIG. 5 is a process flow diagram illustrating a first method to obtain carbon monoxide from the anode side of the mixed ion transport reactor of FIG. 1.

With reference to FIG. 5, the second product stream 46 may then have the hydrogen 81 removed by hydrogen separator 60b and the carbon monoxide 83 purified by adsorption, permeation, or distillation 78. The hydrogen produced and the carbon monoxide produced can then be blended in any desired ratio for whatever application is desired because they were obtained separately. This embodiment requires the input of heat that can be obtained from any of the heat generating processes described herein.

Figure 6:
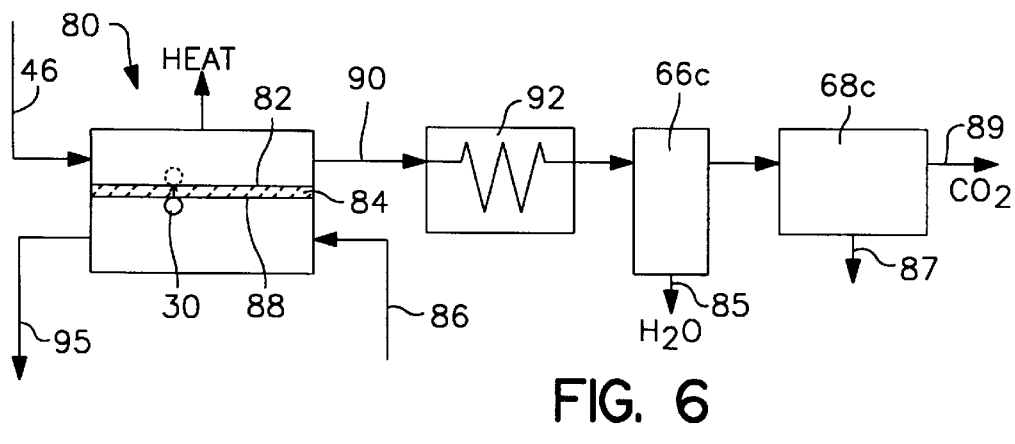
FIG. 6 is a process flow diagram illustrating a process to obtain both hydrogen and carbon dioxide from the anode side of the mixed ion transport reactor of FIG. 1.

If additional hydrogen is not required and carbon dioxide is a desired product, a second ion transport reactor 80 as illustrated in FIG. 6 may be utilized. The second product stream 46 is delivered to the anode side 82 of oxygen selective ion transport membrane 84. An oxygen donating gas, such as air, is provided as feed stream 86 to the cathode side 88 of the oxygen selective ion transport membrane 84 and an oxygen-depleted stream 95 is generated. Elemental oxygen 30 dissociated from the feed stream 86 is transported across the oxygen selective ion transport membrane and provides oxygen ions to the second product stream 46. In an exothermic reaction, the carbon monoxide contained within the second product stream 46 is converted to carbon dioxide. The carbon dioxide-containing stream is then cooled such as by heat exchanger 92 and moisture 85 is removed such as by coalescer 66c. The carbon dioxide is further purified and/or dried such as by using amine process equipment 68c and carbon dioxide product 89 recovered while waste stream 87 typically is discarded.

Figure 7:
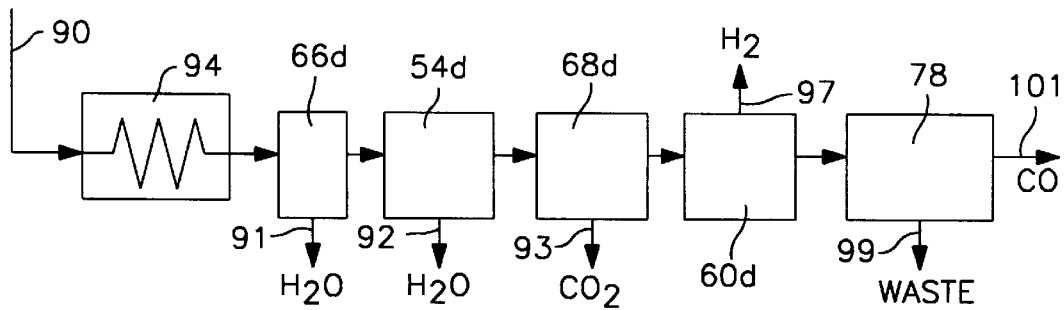
FIG. 7 illustrates a process to obtain carbon dioxide, hydrogen gas and carbon monoxide from the anode side of the mixed ion transport reactor of FIG. 1.

If the output 90 from the anode side 82 of the second ion transport reactor 80 is to be converted to syngas, then the output 90 is processed in accordance with FIG. 7. The output is first cooled, such as by heat exchanger 94 and moisture 91 removed such as by coalescer 66d. A dryer 54d removes substantially all the remaining free water 92 and carbon dioxide 93 is then removed as either a waste product or a desired product by a carbon dioxide purifier such as with amine process equipment 68d. Hydrogen separator 60d produces a stream of hydrogen gas 97 as an output product. Carbon monoxide purifier 78 generates a carbon monoxide output 101 and a waste stream 99.

Figure 8:
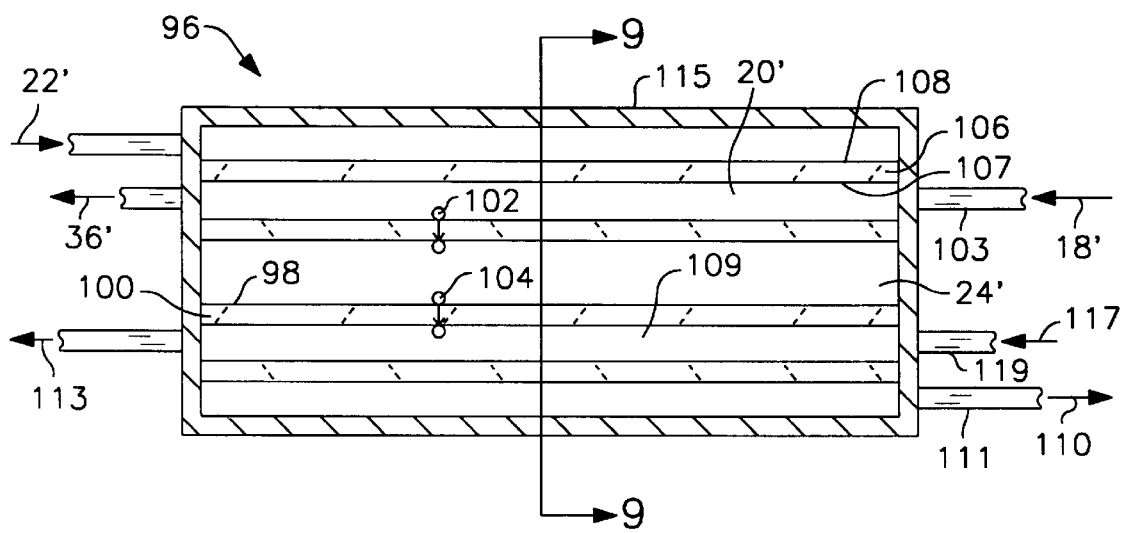
FIG. 8 illustrates in cross-sectional side representation a chemical reactor containing both an oxygen-selective mixed ion transport membrane and a proton-selective mixed ion transport membrane.
Figure 9:
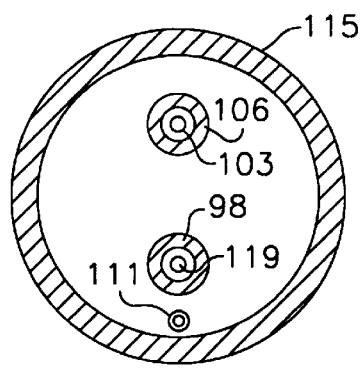
FIG. 9 illustrates the reactor of FIG. 8 in cross-sectional end representation along the lines 9—9 in FIG. 8.

FIGS. 3, 4, and 7 illustrate a hydrogen separator as a unit, separate from the ion transport reactor. It is within the scope of the invention to integrate the hydrogen separator with the ion transport reactor as illustrated in FIGS. 8 and 9 to form a combined reactor 96.

The combined reactor 96 has a tubular oxygen selective ion transport membrane 106 with a cathode side 107 and an anode side 108. A first reaction vessel or chamber 20 receives an oxygen donating first feed stream 18' through a conduit 103, and elemental oxygen 102 dissociated from this oxygen donating first feed stream 18 is transported across the oxygen selective ion transport membrane 106 to a second reaction vessel 24' which is defined by outer shell 115 and is in fluid communication with the anode side 108 of the oxygen selective ion transport membrane 106 and an anode side 98 of a proton conducting membrane 100. Elemental hydrogen 104, analogous to elemental oxygen defined above, is hydrogen uncombined with any other element of the periodic table. The elemental hydrogen is dissociated on the anode side 98 of the proton conducting membrane 100 and transported across the proton conducting membrane as hydrogen ions (protons). The protons are accumulated in a third reaction vessel 109 where they combine to form hydrogen gas as an output product 113.

The proton conducting membrane 100 is any suitable material, such as palladium-based materials and ceramics, that selectively conducts either hydrogen or protons, such as palladium based materials and ceramics. Table 2 gives several examples of proton conducting ceramics applicable in the integrated ion/proton transport reactor 96. These materials may be contrasted with those set forth in Table 1 and in U.S. Pat. Nos. 5,702,999 (Mazanec et al.), U.S. Pat. No. 5,712,220 (Carolan et al.) and U.S. Pat. No. 5,733,435 (Prasad et al.).

TABLE 2

Proton Conductor Materials

1. Doped cerates based on
   (a) $SrCe_{1-x}M_xO_{3-\delta}$ (e.g. $SrCe_{0.95}Yb_{0.05}O_{3-\delta}$) and
   (b) $BaCe_{1-x}M_xO_{3-\delta}$ (e.g. $BaCe_{0.8}Yb_{0.2}O_{3-\delta}$ and $BaCe_{0.9}Nd_{0.1}O_{3-\delta}$)
   where x < than the upper limit of solid solution formation range, generally about 0.2.
   (Generally the doped barium cerates show the highest conductivity.)
2. Substituted solid solution series such as:
   (a) $SrCe_{0.9}Y_xNb_yO_{3-\delta}$ [$\delta = (x - y)/2$, and $x + y - 0.1$] and
   (b) $SrCe_{1-z}Zr_zY_{0.05}O_{3-\delta}$ [$\delta = 0.025$]
3. Acceptor (Sc, Y, Yb)-doped $SrZrO_3$ and $SrTiO_3$, perovskite-type
4. Doped zirconates based on $CaZrO_3$ (e.g. $CaZr_{0.9}In_{0.1}O_{3-\delta}$) $SrZrO_3$ (e.g., $SrZr_{0.95}Y_{0.05}O_{3-\delta}$ and $SrZr_{0.9}Yb_{0.1}O_{3-\delta}$) and $BaZrO_3$
5. $SrYb_{0.05}(Ce_{1-x}Zr_x)_{0.95}Y_{0.05}O_{3-\delta}$ [e.g, x = 0, 0.25, 0.5, 0.75 1.0 and $\delta$ from stoichiometry]
6. Complex perovskites of the types $A_2(B'B'')O_6$ [B' and B'' ions have charges 3+ and 5+ ] and $A_3(B'B''_2)O_9$ [B' and B'' ions have charges 2+ and 5+], whereas A ions are always charge 2+.
   E.g., $Ba_3(CaNB_2)O_9$
7. Acceptor(M = Gd, Y)-doped $BaCeO_3$, i.e. $Ba_{1-x}M_x)(Ce_{1-y}M_y)O_{3-\delta}$
8. $BaCe_{1-x}Ge_xO_{3-\delta}$
9. Pyrochlore-type structure oxide ceramics:
   $A_2Zr_{2-x}Y_xO_{7-\delta}$ (A = La, Nd, Gd, Sm)
   $Y_2Ti_{2-x}M_xO_{7-\delta}$ (M − In, Mg)
10. Hydrogenated yttrium-barium cuprate:
    $H_xBa_2YCu_3O_6$, where x = 2 m + h, y − 6.5 + m + d; m = 0,1,1,2; h > 0; d < 1
11. $KTaO_3$-based oxides and $Y_2O_3$ ceramic In the combined reactor 96, both the oxygen selective ion transport membrane 106 and the proton conducting membrane 100 are preferably mixed conductors, but external electrodes and an external circuit can be attached to conduct electrons if necessary. When the oxygen donating first feed stream 18' is steam, elemental oxygen 102 is transported across the oxygen selective ion transport membrane 106 and hydrogen remains within the first product stream 36'. The hydrogen can be separated from the first output stream 36' by any of the processes described above or combined with the oxygen accepting second feed stream 22' and removed through proton conducting membrane 100.

Transport of hydrogen ions from the second reaction vessel 24' to third reaction vessel 109 shifts the $H_2/CO$ ratio in the second reaction vessel toward carbon monoxide and increases methane conversion. Nearly complete conversion of methane is possible utilizing the combined reactor 96. The output 110 exiting the second reaction vessel 24' through conduit 111 consists primarily of carbon monoxide with some unconverted hydrocarbons, hydrogen, steam, and carbon dioxide. Each of these products can be recovered using the processes described above.

In some embodiments it is desirable to provide a sweep gas 117 to third reaction vessel 109 through a conduit 119 as shown in FIGS. 8 and 9. The relative flux rates through membranes 100 and 106 determine the number of tubes to be used for each type of membrane; an unequal number is preferred where the relative fluxes differ as compared to the total desired output of the combined reactor 96.

An alternative process for use with the combined reactor 96 is to feed a steam and air stream between the two membranes 100 and 106 to the second reaction vessel 24'. In this configuration, both products of water dissociation, hydrogen and oxygen, would pass through the membranes. Hydrogen would be removed through the proton conduction or hydrogen-permeable membrane 100 and oxygen would be removed through the oxygen selective ion transport membrane 106, with outer surface 108 acting as the cathode side and inner surface 107 acting as the anode side.

It may be difficult to establish an operating condition, especially temperature, at which both membranes 100 and 106 effectively function when formed from different materials. Therefore, in one embodiment, both membranes may be formed from a single membrane material that is permeable to both hydrogen and oxygen. An exemplary material is a $BaCeO_3$ based electrolyte. Use of a single material for both membranes eliminates problems such as material interaction and uneven thermal expansion. In this embodiment, it is possible to electrically drive the conduction because $H^+$ and $O^{--}$ ions would pass through different membranes in electrically driven systems. The steam inlet stream would be on the cathode side 108 of the oxygen selective ion transport membrane 106 and the anode side 98 of the proton conducting membrane 100.

In the parallel, spaced from each other tube configuration illustrated in FIG. 9, the oxygen accepting stream ($CH_4$) typically is on the shell side of oxygen permeable membrane tubes and the separate hydrogen permeable membrane tubes. As yet another alternative, if the oxygen donating stream is steam, this steam stream could be on the shell side. In other constructions, membranes 100 and 106 are formed as parallel, spaced plates or concentric tubes.

Figure 10:
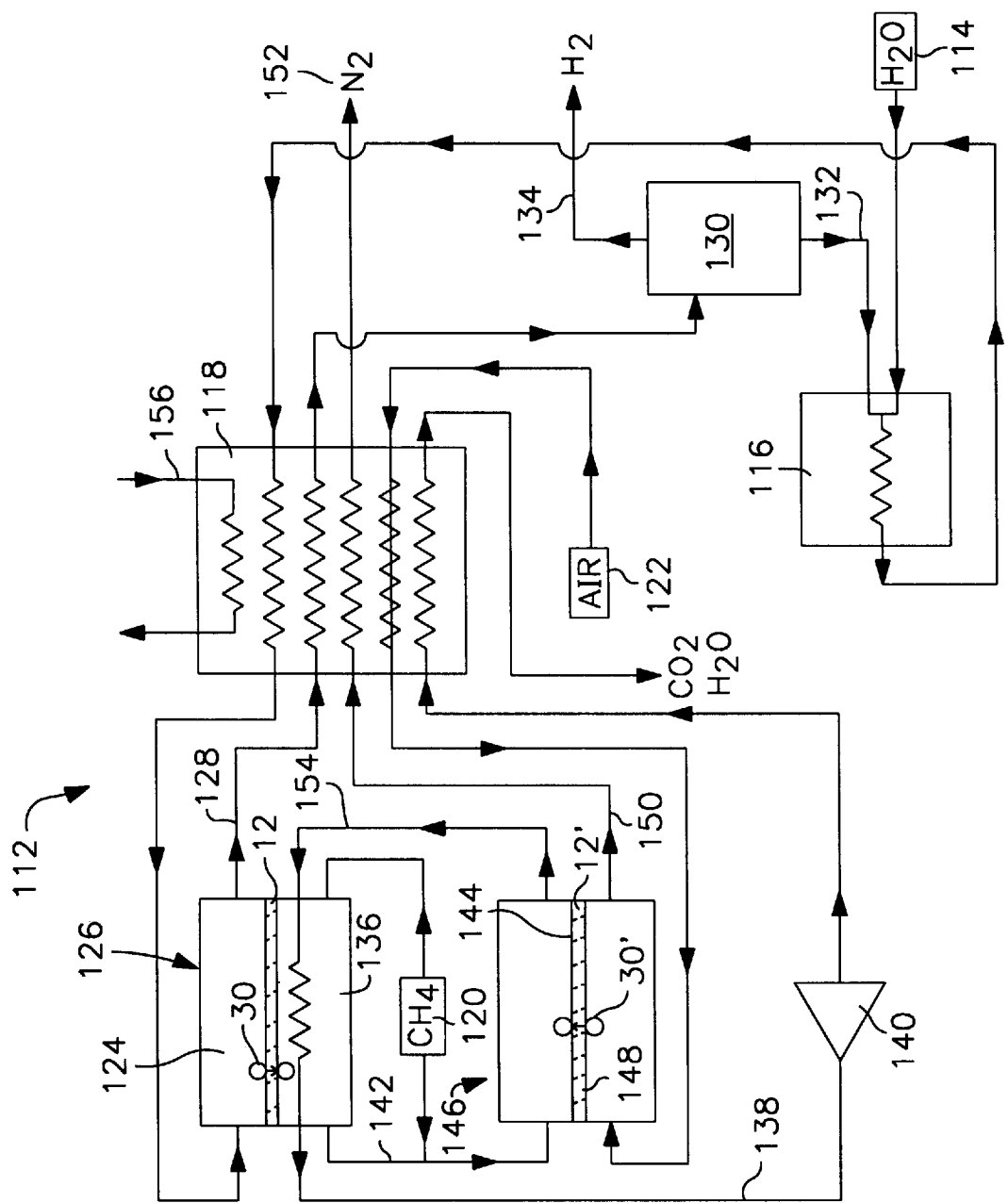
FIG. 10 is a process flow diagram illustrating a process of the invention for enhancing the production of hydrogen from methane.

FIG. 10 schematically illustrates a process flow 112 that maximizes the hydrogen output. The makeup constituents include water 114 that is converted to steam by boiler 116 to generate a steam stream 159 which is further heated at heat exchanger 118. A second input is methane 120 and a third input is air 122. The water 114, in the form of steam, is delivered to the cathode vessel or chamber 124 of a first ion transport reactor 126 having an oxygen selective ion transport membrane 12. At the cathode side 14 of the oxygen selective ion transport membrane 12, the steam is dissociated into hydrogen and elemental oxygen 30. A mixture 128 of non-dissociated steam and hydrogen gas at elevated temperatures is returned to heat exchanger 118 where a portion of the contained heat is released. The cooled mixture is delivered to separator 130 and the water 132 returned to boiler 116 to be combined with input water 114 to generate the steam stream 159. The hydrogen portion 134 is recovered as product.

The methane 120 is delivered to the anode vessel or chamber 136 of the first ion transport reactor 126 where it reacts with the oxygen ions. The maximum amount of hydrogen is produced in the cathode chamber 124 by driving the oxidation reaction on the anode chamber 136 as far as possible such that the output from the anode chamber 136 is a mixture of steam, carbon dioxide and unreacted methane. The outlet stream 142 may be combined with additional methane 120 and delivered to the anode side 144 of the second ion transport reactor 146 where the outlet stream combines with oxygen to form combustion gases 154 that are used to provide heat for the endothermic reforming reactions in the first ion transport membrane reactor 126. After exiting the first ion transport reactor, combustion gases 138 may either be processed to recover carbon dioxide or, alternatively, may be utilized to drive gas turbine 140 to generate electric power as a by-product and/or to provide additional heat for heat exchanger 118. Air input 122 to the second ion transport reactor 146 is heated by heat exchanger 118 and provided to the cathode side 148 where a portion of the oxygen 30' contained in the air 122 is dissociated and transported across the oxygen selective ion transport membrane 12'. The oxygen depleted air 150 is cooled by release of a portion of the contained heat in heat exchanger 118. Nitrogen gas 152 can be recovered if sufficient oxygen has been removed by the ion transport membrane 12'.

Since the process 112 is predominantly exothermic, cooling water 156 is utilized to regulate the temperature of heat exchanger 118. The regulation is controlled automatically in one embodiment by a microprocessor which receives temperature data from one or more sensors disposed in system 112.

Figure 10A:
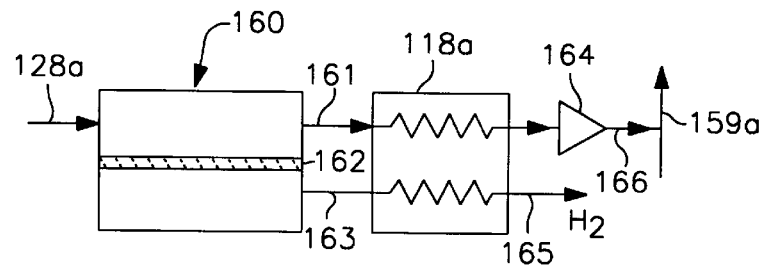
FIG. 10A is a diagram illustrating a portion of an alternative arrangement for the process of FIG. 10.

In an alternative construction, FIG. 10A, a stream 128a of non-dissociated steam and hydrogen from cathode chamber 124 of first ion transport reactor 126, FIG. 10, is directed to a hydrogen membrane separator 160, FIG. 10A, having a Pd membrane or proton conducting membrane 162. Heat is recovered from hydrogen permeate stream 163 in a portion of heat exchanger 118a (having other streams passing therethrough such as shown in FIG. 10) to produce cooled hydrogen product stream 165.

Steam-rich retentate stream 161 also donates heat through heat exchanger 118a and is compressed by blower 164 such that the pressure of compressed stream 166 is equivalent to the pressure of steam stream 159a. In this construction, separator 160 replaces separator 130 and streams 132, 134 of FIG. 10. In yet another construction (not shown), the separator 160 is positioned downstream from heat exchanger 118, FIG. 10, to reduce the temperature of stream 128a.

Separator 160 preferably is disposed relative to heat exchanger 118 to optimize the operating temperature of membrane 162.

It is recognized that the ion transport membranes and proton transport membranes of the invention may have any desired configuration including tubes, plates and straight channels. In addition, flux rates may be enhanced through the incorporation of catalysts, surface coatings or porous layers with the membranes. Catalysts such as platinum or palladium, or any other active catalyst for H2 oxidation could be used for $H_2O$ dissociation. Likewise, an active catalyst for CO oxidation will be active for CO2 dissociation. Standard reforming catalysts may also be suitable for some applications.

Specific features of the invention are shown in one or more of the drawings for convenience only, as each feature may be combined with other features in accordance with the invention. Alternative embodiments will be recognized by those skilled in the art and are intended to be included within the scope of the claims.

We claim:

1. A process for generating an enhanced output of desired product from an ion transport reactor, comprising:

a) providing the ion transport reactor, the ion transport reactor having a product oxygen-selective ion transport membrane, a reaction space, and a further oxygen-selective ion transport membrane, each of the product and further oxygen-selective ion transport membranes having a cathode side and an anode side, the anode side of each of the product and further oxygen-selective ion transport membranes being located within the reaction space;

b) delivering an oxygen-donating first feed stream containing the desired product in a chemically bound state at a first oxygen partial pressure to said cathode side of said product oxygen-selective ion transport membrane while simultaneously delivering an oxygen-accepting second feed stream to said reaction space and an oxygen containing feed stream containing oxygen in a chemically unbound state to said cathode side of said further oxygen-selective ion transport membrane;

c) operating said ion transport reactor with said product and further oxygen-selective ion transport membranes at an elevated temperature sufficient to facilitate oxygen ion transport through said product and further oxygen-selective ion transport membranes;

d) transporting elemental oxygen obtained from said first feed stream through said product oxygen-selective ion transport membrane to react with a portion of said second feed stream so that said desired product is produced at the cathode side of said product oxygen-selective ion transport membrane and another product is produced within said reaction space by way of chemical reactors that are on-balance endothermic;

e) reacting the oxygen transported through the further oxygen-selective ion transport membrane with a further portion of said second feed stream in an exothermic oxidative reaction to thermally balance said chemical reactions so that a sum thereof is energy neutral; and f) recovering a first product stream containing a first portion of said desired product from said cathode side, and recovering a second product stream from said reaction space.

2. The process of claim 1 wherein said first oxygen partial pressure is greater than said second oxygen partial pressure.

3. The process of claim 2 wherein said oxygen-donating first feed stream comprises at least one component selected from the group consisting of $NO_x$, water vapor, carbon dioxide, and combinations thereof, and wherein said oxygen-accepting second feed stream comprises at least one component selected from the group consisting of hydrogen-containing reactants, carbon-containing reactants and combinations thereof.

4. The process of claim 3 wherein said oxygen-accepting second feed stream contains hydrogen in a chemically bound state and said second product stream contains a second portion of said desired product, wherein the sum of said first portion plus said second portion provides a total of said desired product, whereby the percent conversion into said desired product from the combination of said first portion and said second portion exceeds that attainable from said second feed stream alone, thereby providing said enhanced output of said desired product.

5. The process of claim 4 further including separating hydrogen, as said desired product, from at least one of said first portion and said second portion.

6. The process of claim 5 further including heating said oxygen-donating first feed stream to an elevated temperature prior to delivery of said first feed stream to said cathode side.

7. The process of claim 6 further including passing at least a fraction of said second portion through a heat exchanger in order to provide recovered heat from said second portion, and passing said recovered heat to said oxygen-donating first feed stream in order to heat said first feed stream.

8. The process of claim 2 further including heating said oxygen-selective ion transport membrane to an elevated temperature in excess of 500° C.

9. The process of claim 8 further including combusting at least a percentage of said second product portion and utilizing heat generated by said combusting to heat said ion transport membrane.

10. The process of claim 4 further including delivering said second product stream to a first water-gas shift reactor at a first temperature.

11. The process of claim 3 further including recovering carbon monoxide from said second product stream.

12. The process of claim 3 further including recovering synthesis gas from said second product stream.

13. A process for generating an enhanced output of desired product from an ion transport reactor, comprising:
   a) providing the ion transport reactor, having an oxygen-selective ion transport membrane disposed therein with a cathode side and an anode side;
   b) delivering an oxygen-donating first feed stream at a first oxygen partial pressure to said cathode side while simultaneously delivering an oxygen-accepting second feed stream, comprising at least one component selected from the group consisting of hydrogen containing reactants, carbon containing reactants and combinations thereof, to said anode side to establish a second oxygen partial pressure on said anode side, said first oxygen partial pressure being greater than said second oxygen partial pressure by a ratio factor of at least 1000;
   c) heating said oxygen-selective ion transport membrane to an elevated temperature sufficient to facilitate oxygen ion transport through said ion transport membrane; and
   d) transporting elemental oxygen obtained from said first feed stream through said oxygen-selective ion transport membrane to react with said second feed stream; and
   e) recovering a first product stream containing a first portion of said desired product from said cathode side, and recovering a second product stream containing a second portion of said desired product from said anode side, wherein the sum of said first portion plus said second portion provides a total of said desired product, whereby the percent conversion into said desired product from the combination of said first portion and said second portion exceeds that attainable from said second feed stream alone, thereby providing said enhanced output of said desired product.

14. The process of claim 13 wherein said oxygen-selective ion transport membrane is heated to a temperature in the range of from 700° C. to 1200° C.

15. The process of claim 14 wherein said oxygen-donating first feed stream comprises at least one component selected from the group consisting of NOx, water vapor, carbon dioxide, and combinations thereof, and wherein said oxygen-accepting second feed stream comprises at least one component selected from the group consisting of methane, natural gas, and combinations thereof.

* * * * *